United States Patent Office 2,871,252
Patented Jan. 27, 1959

2,871,252
PREPARATION OF ORGANO MERCURIC HYDROXIDES

Harold F. Walton and Thomas D. Waugh, Boulder, Colo., assignors, by mesne assignments, to Morton Chemical Corporation, Chicago, Ill., a corporation of Delaware No Drawing. Application July 6, 1954
Serial No. 441,684

16 Claims. (Cl. 260—431)

This invention relates to a new and improved process for converting organo mercuric salts to organo mercuric hydroxides. More particularly, this invention relates to a new and improved process for converting organo mercuric halides to organo mercuric hydroxides. In one specific embodiment thereof, this invention relates to a new and improved process for converting alkyl mercuric halides to alkyl mercuric hydroxides.

A number of methods for the preparation of organo mercuric hydroxides are well known to those skilled in the art and a variety of organo mercuric hydroxides are commercially available products. However, all prior art processes for the preparation of organo mercuric hydroxides exhibit various disadvantages.

One process for the preparation of organo mercuric hydroxides involves the treatment of a solution of an organo mercuric halide with a suspension of silver hydroxide or hydrated silver oxide. An efficient and clear cut metathesis occurs and the corresponding organo mercuric hydroxide and the appropriate silver halide are produced. However, this method, to be economically feasible on the commercial scale requires the recovery of the silver halide formed and its conversion to silver hydroxide or hydrated silver oxide for reuse in the process.

Another method for the production of organo mercuric hydroxides involves the interaction of an organo mercuric salt, an organo mercuric halide for example, with an alkali metal hydroxide. If an organo mercuric halide is employed in this process, reaction with the alkali metal hydroxide results in the formation of the corresponding organo mercuric hydroxide and the appropriate alkali metal halide. It is necessary that this reaction be conducted in a medium in which the alkali metal salt that is formed is less soluble than the organo mercuric hydroxide produced. If an organo mercuric halide is employed, media such as isopropyl alcohol, 2-butanol and n-amyl alcohol are more or less suitable as reaction media. After the organo mercuric salt has reacted with the alkali metal hydroxide it is necessary to filter the reaction mixture to separate the precipitated alkali metal salt and this filtration step is frequently quite difficult. However, the most serious difficulty connected with this process for the preparation of organo mercuric hydroxides resides in the fact that the alkali metal salts that are formed are more or less soluble in the reaction medium employed and as a result the filtrate containing the organo mercuric hydroxide is contaminated with more or less alkali metal salt. This not only renders the organo mercuric hydroxide impure but also frequently gives rise to corrosion problems. A solution of halide contaminated organo mercuric hydroxide, for example, rapidly corrodes containers that are entirely satisfactory for the storage of halide free solutions of organo mercuric hydroxides.

In accordance with this invention, organo mercuric salts are converted to organo mercuric hydroxides by contacting a solution or suspension of the organo mercuric salt with certain types of anion exchange resins in hydroxyl form. On the basis of information available in the prior art dealing with the interaction of salts and strongly basic anion exchange resins, it is not to be expected that such a reaction would be feasible for the conversion of organo mercuric salts to organo mercuric hydroxides. Such ion exchange reactions, as implied by their very name, are largely or exclusively ionic in character and the extent of reaction is determined by the usual laws of ionic equilibrium.

The anionic resin in hydroxyl form is highly ionized, giving rise to complex and immobile resin cations and hydroxyl anions. The solution of the salt being subjected to the influence of the anion exchanger is also ionized with production of cations of the metal and anions of the acid radical involved in salt formation. In the ion exchange reaction, ionic equilibria are set up in accordance with the following scheme:

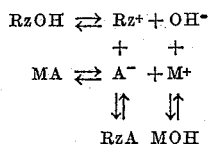

where RzOH is an anion exchange resin in hydroxyl form and MA is a salt.

On contacting a solution of a salt with a strongly basic anion exchange resin in hydroxyl form, the ion exchange reaction proceeds to the point where the forward and reverse reactions are in equilibrium and in the usual case the equilibrium point is very far from that representing even reasonably complete ion exchange. As the forward ion exchange reaction proceeds, the concentration of hydroxyl ion increases due to the formation of increasing amounts of the highly ionized metallic hydroxide. This hydroxyl ion takes part in the reverse reaction:

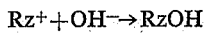

and also tends to react with and decompose the resin-anion compound that has formed:

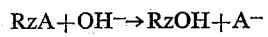

Both of these reverse reactions tend to counteract the desired forward ion exchange reaction and when the rate of the forward and reverse reactions is the same, an equilibrium is established and, as previously mentioned, in the usual case this equilibrium point is very far from that representing even reasonably complete ion exchange.

The only way to obtain reasonably complete ion exchange in the usual case is to neutralize the metallic hydroxide as it is formed. This results in the production of practically unionized water and accordingly reduction of the hydroxyl ion concentration to an inconsequential level. Due to the resulting low level of the hydroxyl ion concentration, which level may be considered to be zero for all practical purposes, there is no possibility of the above reverse reactions and accordingly the forward ion exchange reaction proceeds to substantial completion.

Methods are well known in the ion exchange art for continuous neutralization of hydroxyl ions formed during ion exchange but these methods are only applicable if, as is very frequently the case, it is desired to remove ions but not recover them in usable form. In the process of the present invention such prior art neutralization procedures cannot be applied as a salt is converted to a hydroxide and this hydroxide is the desired product of the process. Obviously, to neutralize the desired hydroxide as it is formed would completely defeat the objects of this invention.

It has been found that organo mercuric salts may be converted to organo mercuric hydroxides by contacting solutions or suspensions of such salts with a strongly basic anion exchanger in hydroxyl form. It is a new and unexpected result that these ion exchange reactions proceed to substantial completion. It is suggested that this new and unexpected result may be explained on the basis that organo mercuric hydroxides ionize to a surprising and unexpectedly small extent and accordingly may be considered to be, in effect, self neutralizing in the ion exchange reaction but it is to be understood that this explanation is theory only.

One object of this invention is to provide a new and improved process for the conversion of organo mercuric salts into organo mercuric hydroxides.

Another object of this invention is to provide a new and improved process for the conversion of organo mercuric halides into organo mercuric hydroxides.

A further object of this invention is to provide a new and improved process for the conversion of alkyl mercuric halides into alkyl mercuric hydroxides.

An additional object of this invention is to provide a new and improved process for the conversion of methyl mercuric halides into methyl mercuric hydroxides.

Other objects of this invention will become apparent as the description thereof proceeds.

For the better understanding of this invention the following illustrative but non-limiting examples thereof are given:

Example 1

Amberlite IRA–400, a strongly basic, polystyrene quaternary amine type anion exchange resin (manufactured by Rohm and Haas Company), in chloride form was introduced into a water filled cylindrical vessel until a resin column of the desired depth had formed. The golden brown resin was converted to the hydroxyl form by passing 22 volumes of a 4% sodium hydroxide solution through the resin column at a rate of 0.11 to 0.12 volume per minute. (Unless specifically mentioned to the contrary, herein the volume of the resin column just prior to use in the desired ion exchange reaction is taken as unity and other volumes are expressed as multiples or fractions of this unit volume. Accordingly, the the above, the chloride form of the resin was converted to the hydroxyl form by passing 0.11 to 0.12 resin volume per minute of a 4% solution of sodium hydroxide through the resin column until a total of 22 resin volumes of the sodium hydroxide solution had been passed, the fundamental unit volume being that occupied by the resin column just prior to use in the desired ion exchange reaction.) During conversion of the chloride form of the resin to the hydroxyl form, the resin becomes much darker and the resin column increase slightly in volume. The column is then rinsed by passage of water therethrough (91 volumes at about 0.22 volume per minute) and is finally conditioned by passage of isopropyl alcohol therethrough. During the isopropyl alcohol treatment, the resin darkens further but becomes somewhat transparent and the resin column decreases in volume and is in the proper form and condition for the ion exchange reaction. (Increases and decreases in the volume of the resin column frequently occur during the treatment and conditioning of the resin and accordingly the fundamental unit volum of the resin column is taken to be that of the column of resin after it has been brought to the required form and condition for use in the desired ion exchange reaction.)

A concentrated solution of impure methyl mercuric hydroxide in isopropyl alcohol was passed through the resin column treated as above described. This impure concentrate was prepared by the previously described conventional procedure involving interaction of a solution of methyl mercuric halides with sodium hydroxide and was contaminated with small amounts of halide ions for reasons previously discussed. The impure concentrate contained about 7% mercury, calculated as the element, and somewhat less than 0.2% halide, calculated as chloride although both chloride and bromide ions were present. The impure concentrate was passed through the column at a rate of 0.11 volume per minute. From time to time during passage of this concentrate, the effluent was examined for the presence of halogen and passage of the concentrate was continued until an appreciable amount of halogen appeared in the effluent at which time passage of the concentrate was discontinued and the column was washed. The results obtained are tabulated below:

| Effluent, Sample | Halogen Content | Mercury Content, Percent | Percent of Hg Charged Recovered | |
|---|---|---|---|---|
| | | | In Sample | Cumulative |
| 1 | Negligible | 4.96 | 9.1 | 9.1 |
| 2 | do | 6.28 | 12.7 | 21.8 |
| 3 | do | 7.8 | 17.7 | 39.5 |
| 4 | do | 7.62 | 18.2 | 57.7 |
| 5 | do | 7.45 | 15.4 | 73.1 |
| 6 | do | 7.85 | 19.7 | 92.8 |
| 7 [1] | 0.015% | 2.08 | 9.0 | 101.8 |

[1] Partly wash.

The above results show almost 93% of the mercury charged was recovered in the effluent before any appreciable amount of halogen in the impure concentrate charged to the column "broke through" into the effluent. Almost 1.4 parts by weight mercury was freed of contaminating halogen per part by weight of resin used. All of the mercury charged to the column was recovered in the effluent samples and in the wash liquor that was passed through the column after halogen began to appear in the effluent. (The mercury balance is actually more than 100%. However, the analytical determination of mercury is not too accurate and the mercury balance is based on the sum of several such analyses, all of which accounts for the somewhat high balance obtained.)

The excellent results obtained in this example are entirely unexpected in view of the previously discussed equilibria involved in ion exchange reactions. The impure concentrate is already very rich in the desired product of the anion exchange reaction (methyl mercuric hydroxide) and contains but small amounts of the materials that it is desired to remove (halide ions). Under these conditions it would be expected that little if any ion exchange would occur. It would be expected that sufficient hydroxyl ions would be furnished by the charge to hold the hydroxyl ions of the resin within the matrix of the immobile positively charged resin ions and accordingly lower or even completely destroy the ion exchange properties of the resin. Also, it would be expected that sufficient hydroxyl ions would be furnished by the charge to decompose any resin halide complex that might form through anion exchange reactions. However, contrary to these conclusions based on theoretical considerations, the anion exchange reaction actually proceeds to completion or substantial completion and the resin is capable of reducing the halide content of the impure methyl mercuric hydroxide rich concentrate to negligible proportions. It is believed that this unexpected result is due to an unexpectedly low extent of dissociation of methyl mercuric hydroxide although, as set forth previously, this explanation represents theory only.

Example 2

Amberlite IRA–400 was converted to the hydroxyl form and then washed with water as previously described. The resin column was then conditioned by passing one volume of Cellosolve (ethylene glycol monoethyl ether) therethrough. Following this, 1.9 volumes of a 0.1875 M solution of methyl mercuric chloride in Cellosolve was passed through the column at a rate of 0.095 volume per minute. The column was then rinsed with about one volume of Cellosolve followed by one volume of distilled water. Of the mercury charged to the column, 94% was recovered in the effluent and washings in substantially halide free form.

Example 3

Similar to Example 2, except that the solution of methyl mercuric chloride was passed through the column until halogen appeared in the effluent. After passing 4.4 volumes of the methyl mercuric halide solution the effluent contained no halogen; the first leakage of halogen was observed after passage of five volumes of solution. After passing 5.9 volumes of the solution through the column, the total effluent contained 90% of the mercury charged while 6.6% of the chlorine originally present in the charge had broken through into the effluent. About 0.3 part by weight of mercury was converted from the chloride to the hydroxide per part by weight of resin used before halogen "broke through" the column.

Example 4

The resin was conditioned as described in Example 2 following which 1.9 volumes of a 0.2 M solution of methyl mercuric bromide in Cellosolve was passed therethrough at a rate of 0.095 volume per minute. The column was then rinsed as described in Example 2 and the resulting halide free effluent and washings contained 88% of the mercury charged.

The column was then regenerated by passing 7.15 volumes of 2 N sodium hydroxide solution therethrough. The regenerated column was water rinsed and then conditioned with Cellosolve as previously described. Again, 1.9 volumes of a 0.2 M Cellosolve solution of methyl mercuric bromide was passed through the column at a rate of 0.095 volume per minute following which the column was rinsed with Cellosolve and water as described in Example 2. Of the mercury charged, 91% was recovered in the combined effluent and washings in halide free form.

Example 5

Four volumes of a 0.072 M solution of methyl mercuric iodide in Cellosolve containing 0.025 mole sodium hydroxide per liter were passed through a column of NPS–1 resin in hydroxyl form. NPS–1 is a strongly basic polyquaternary amine resin manufactured by The Permutit Company. After passage of the solution, the column was rinsed with Cellosolve and water. The combined effluent and washings were halogen free and contained 87% of the mercury charged to the column.

The resin was regenerated by passing five volumes 2 N sodium hydroxide solution therethrough followed by a water rinse. Four volumes of a 0.0675 M solution of methyl mercuric iodide in Cellosolve containing 0.025 mole sodium hydroxide per liter were passed through the column following which the column was rinsed as previously described in this example. The combined effluent and washings were halogen free and contained 81% of the mercury charged to the column.

Example 6

Due to the low solubility of methyl mercuric iodide in water, the solid salt was added to one volume of Amberlite IRA–400 in hydroxyl form and five volumes of water. The salt to resin ratio was 0.00028 mole/ml. resin. The resulting suspension, the liquid portion of which was a saturated solution of methyl mercuric iodide in water, was then shaken. In about one half hour the suspended methyl mercuric iodide had disappeared but the shaking was continued 1.5 hours longer. The resulting solution was separated from the resin. The solution was free from halogen and contained 89% of the mercury charged.

The separated resin was regenerated by treatment with sodium hydroxide, washed with water and was used to convert a further quantity of methyl mercuric iodide as previously described. (Salt to resin ratio, 0.00042 mole/ml. resin.) The separated solution contained 98% of the mercury taken and was halide free.

Example 7

An aqueous suspension of methyl mercuric iodide was treated with NPS–1. The technique employed was generally similar to that described in Example 6 with the exception that in the present example a little sodium hydroxide was added to the reaction mixture (0.00011 mole per gram of resin). After completion of the ion exchange reaction, the separated resin was regenerated with ten volumes 2 N sodium hydroxide solution, was washed with water and then employed to convert a further quantity of methyl mercuric iodide, a series of six such conversions being made, the resin being regenerated as described between each run. The results obtained as shown in the tabulation:

| Run No. | Salt: Resin Ratio Moles/ml. Resin | Percent of Hg Charged Recovered in the Solution | Percent of I₂ Charged Appearing in the Solution |
| --- | --- | --- | --- |
| 1 | 0.000307 | 86.4 | 1.56 |
| 2 | 0.000162 | 89.0 | Trace |
| 3 | 0.000161 | 88.6 | 0.019 |
| 4 | 0.000244 | 92.1 |  |
| 5 | 0.000272 | (*) | (*) |
| 6 | 0.000240 | 93.1 | 5.55 |

*Incomplete reaction; solution not analyzed.

Example 8

A column of Amberlite IRA–400 was converted to the hydroxyl form and conditioned exactly as described in Example 2. One and nine tenths volumes of a 0.1625 M solution of methyl mercuric chloride in Cellosolve containing 0.1625 mole per liter dicyandiamide were passed through the column at a rate of 0.095 volume per minute. The column was rinsed with Cellosolve and then with water. The combined effluent and washings contained 89% of the mercury charged and were halogen free.

Example 9

The procedure of Example 8 was repeated with the exception that a 0.167 M solution of methyl mercuric bromide in Cellosolve containing 0.167 mole per liter dicyandiamide was passed through the column. The combined effluent and washings were halogen free and contained 77% of the mercury charged to the column.

The resin was regenerated by passing 7.15 volumes 2 N sodium hydroxide therethrough following which the resin was rinsed with water and conditioned with Cellosolve as previously described. One and nine tenths volumes of a 0.172 molar solution of methyl mercuric iodide in Cellosolve containing 0.172 mole per liter of dicyandiamide was passed through the column at a rate of 0.095 volume per minute following which the column was rinsed with Cellosolve and water as before. The effluent and washings were halogen free and contained 88% of the mercury charged to the column.

Dicyandiamide forms a rather unstable salt or complex with organo mercuric hydroxides exhibiting an extremely low ionization constant. Accordingly, its employment in ion exchange reactions set forth in the previous examples aids in some measure in driving the reaction to completion. An even more striking effect of dicyandiamide is its influence in preventing alteration of some of the resins employed. When these ion exchange reactions proceed in the absence of dicyandiamide, Amberlite IRA–400, for example, darkens and decreases in volume with repeated use but when dicyandiamide is present repeated use of this resin is accompanied by practically no change in the appearance of the resin and no change in its volume. Methyl mercuric dicyandiamide is a highly useful compound and the procedures of Examples 8 and 9 furnish a convenient process for the production of this material.

While this invention has been described largely in connection with the conversion of methyl mercuric halides into methyl mercuric hydroxide it is not limited thereto. Other alkyl as well as aryl mercuric halides may be employed instead of the methyl mercuric halides specifically considered herein, for example, ethyl mercuric halides such as ethyl mercuric iodide. Also, it is not necessary that the organo mercuric compound be a salt of a hydrogen halide. Organo mercuric salts of other acids behave similarly; for example, phenyl mercuric acetate may be converted to phenyl mercuric hydroxide by the process of this invention.

Be it remembered, that while this invention has been described in connection with specific details and specific examples thereof, these are illustrative only and are not to be considered limitations on the spirit or scope of said invention except in so far as these may be incorporated in the accompanying claims.

What is claimed is:

1. A process for producing lower alkyl mercuric hydroxides comprising contacting a material selected from the group consisting of lower alkyl mercuric chlorides, lower alkyl mercuric bromides and lower alkyl mercuric iodides in a solvent therefor selected from the group consisting of water, i-propyl alcohol and ethylene glycol monoethyl ether with an anion exchange resin of high basicity and in hydroxyl form and separating the solvent, containing the lower alkyl mercuric hydroxide produced, from said resin.

2. A process for producing methyl mercuric hydroxide comprising contacting a material selected from the group consisting of methyl mercuric chloride, methyl mercuric bromide and methyl mercuric iodide in a solvent therefor selected from the group consisting of water, isopropyl alcohol and ethylene glycol monoethyl ether with an anion exchange resin of high basicity and in hydroxyl form and separating the solvent, containing the methyl mercuric hydroxide produced, from said resin.

3. A process for producing methyl mercuric hydroxide comprising percolating a solution of a material selected from the group consisting of methyl mercuric chloride, methyl mercuric bromide and methyl mercuric iodide in a solvent therefor selected from the group consisting of water, isopropyl alcohol and ethylene glycol monoethyl ether through a column of an anion exchange resin of high basicity and in hydroxyl form and collecting the effluent from said resin column, containing the methyl mercuric hydroxide produced, until the halide content of the effluent stream reaches a concentration not exceeding about 0.02% by weight, calculated as chloride.

4. A process for producing methyl mercuric hydroxide comprising percolating a solution of methyl mercuric chloride in a solvent therefor selected from the group consisting of water, isopropyl alcohol and ethylene glycol monoethyl ether through a column of an anion exchange resin of high basicity and in hydroxyl form and collecting the effluent from said resin column, containing the methyl mercuric hydroxide produced, until the chloride content of the effluent stream reaches a concentration not exceeding about 0.02% by weight.

5. The process of claim 4, further characterized by the fact that the solvent is water.

6. The process of claim 4, further characterized by the fact that the solvent is ethylene glycol monoethyl ether.

7. A process for producing methyl mercuric hydroxide comprising percolating a solution of methyl mercuric bromide in a solvent therefor selected from the group consisting of water, isopropyl alcohol and ethylene glycol monoethyl ether through a column of an anion exchange resin of high basicity and in hydroxyl form and collecting the effluent from said resin column, containing the methyl mercuric hydroxide produced, until the halide content of the effluent stream reaches a concentration not exceeding about 0.02% by weight, calculated as chloride.

8. The process of claim 7, further characterized by the fact that the solvent is water.

9. The process of claim 7, further characterized by the fact that the solvent is ethylene glycol monoethyl ether.

10. A process for producing methyl mercuric hydroxide comprising percolating a solution of methyl mercuric iodide in a solvent therefor selected from the group consisting of water, isopropyl alcohol and ethylene glycol monoethyl ether through a column of an anion exchange resin of high basicity and in hydroxyl form and collecting the effluent from said resin column, containing the methyl mercuric hydroxide produced, until the halide content of the effluent stream reaches a concentration not exceeding about 0.02% by weight, calculated as chloride.

11. The process of claim 10, further characterized by the fact that the solvent is ethylene glycol monoethyl ether.

12. The process for producing methyl mercuric hydroxide comprising contacting a suspension of methyl mercuric iodide in an essentially saturated solution of methyl mercuric iodide in water with an anion exchange resin of high basicity and in hydroxyl form for a time sufficient to convert at least substantially all of said methyl mercuric iodide to methyl mercuric hydroxide and separating the liquid reaction mixture, containing the methyl mercuric hydroxide produced, from said resin.

13. The process of claim 4, further characterized by the fact that the solvent is isopropyl alcohol.

14. The process of claim 7, further characterized by the fact that the solvent is isopropyl alcohol.

15. The process of claim 10, further characterized by the fact that the solvent is isopropyl alcohol.

16. The process of claim 10, further characterized by the fact that the solvent is water.

References Cited in the file of this patent

UNITED STATES PATENTS

| | | |
|---|---|---|
| 1,978,447 | Austesweil | Oct. 30, 1934 |
| 2,606,098 | Bauman | Aug. 5, 1952 |

FOREIGN PATENTS

| | | |
|---|---|---|
| 805,092 | France | Aug. 17, 1936 |

UNITED STATES PATENT OFFICE

CERTIFICATE OF CORRECTION

Patent No. 2,871,252 January 27, 1959

Harold F. Walton et al.

It is hereby certified that error appears in the above numbered patent requiring correction and that the said Letters Patent should read as corrected below.

In the grant, lines 2 and 3, line 13, and in the heading to the printed specification, lines 5 and 6, name of assignee, for "Morton Chemical Corporation", each occurrence, read -- Morton Chemical Company --.

Signed and sealed this 28th day of July 1959.

(SEAL)
Attest:

KARL H. AXLINE

Attesting Officer

ROBERT C. WATSON
Commissioner of Patents